March 23, 1937.  G. M. KRAG  2,074,337

NUTCRACKER

Filed Aug. 5, 1935

INVENTOR
GRACE M. KRAG
BY E. J. Andrews
ATTY.

Patented Mar. 23, 1937

2,074,337

UNITED STATES PATENT OFFICE 2,074,337

NUTCRACKER

Grace M. Krag, Chicago, Ill.

Application August 5, 1935, Serial No. 34,783

1 Claim. (Cl. 146—16)

This invention relates to nut crackers, and it has for its object providing a nut cracker that can be very conveniently and quickly operated, and which is adapted to cracking conveniently nuts of any size, and particularly to cracking long nuts endwise, as the jaws can be opened any reasonable distance.

Figure 1:
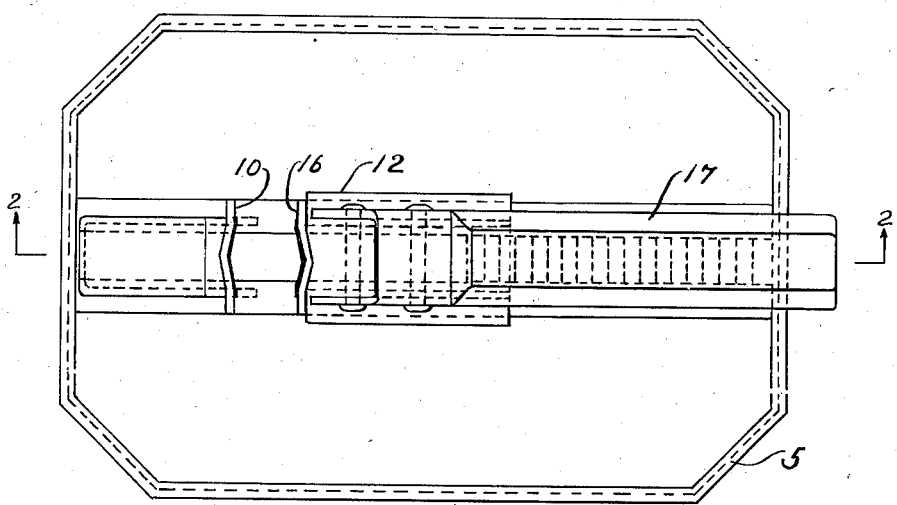
Figure 2:
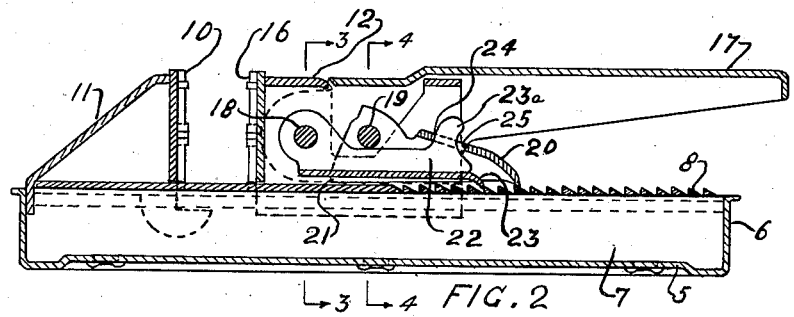
Figure 3:
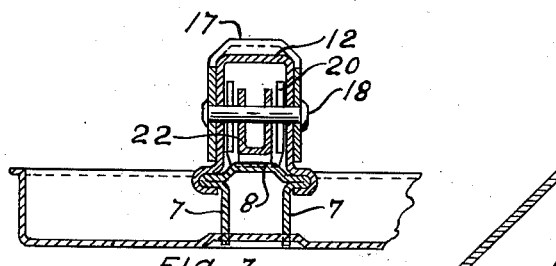
Figure 4:
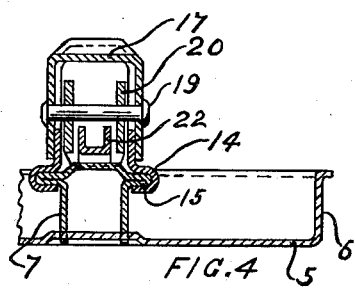
Figure 5:
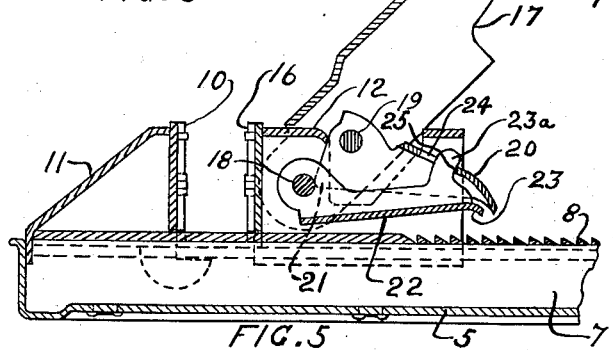

Of the accompanying drawing, Fig. 1 is a plan view of a nut cracker which embodies the features of my invention; Fig. 2 is a sectional view along the line 2—2 of Fig. 1; Figs. 3 and 4 are sectional views along the respective lines 3—3 and 4—4 of Fig. 2; and Fig. 5 is a fragmental view corresponding to Fig. 2, but showing the operating mechanism in different positions.

The nut cracker comprises in general a base plate 5 with side boards 6. This plate supports the mechanism, holds it in position, and is adapted to catch and retain the pieces of nut shells that snap off as the nut is cracked. Fixed to the central portion of this base plate is a U-shaped support 7. On the upper surface of this support is formed or fixed in any suitable manner a rack 8, extending from near the central portion thereof to adjacent one end. Fixed to the upper side of the support at the other end is a jaw 10, preferably braced by a plate 11. Slidably mounted on the upper side of the support is a casing 12. The casing may be mounted on the support by means of flanges 14 fixed to the casing coacting with flanges 15 projecting from the sides of the support. And fixed to this casing is another jaw 16 which is adapted to coact with the jaw 10 in cracking the nuts.

In order to press the jaws together in cracking the nuts, I provide a handle 17, which is pivoted by the pivot 18 to the casing. Also pivoted to the casing by the pivot 19 is a pawl 20. When the handle is raised from the position shown in Fig. 2 the toe of the pawl will slip forward on the rack, and when the handle is lowered the pawl will coact with the rack and force the jaw 16 towards the fixed jaw 10, thus cracking the nut between the jaws. When the handle is raised sufficiently the heel 21 of the pawl will strike against the pivot 18, and this will force the toe of the pawl away from the rack and allow the slidable jaw to be moved backwards away from the fixed jaw.

However, it sometimes happens that the nut will yield somewhat before it cracks and its resiliency, when the handle is raised, will force the movable jaw backwards so that the toe of the pawl coacts with the same tooth of the rack as before and thus the nut cannot be pressed more than before. To overcome this I provide the following means and it is particularly with reference to this that my invention consists.

I provide a second pawl 22 with its heel pivoted to the casing by the pivot 18 and with its toe 23 arranged to coact with the rack 8. When the handle is raised thus releasing the pawl 20 from the rack the pawl 22 will prevent backward movement of the casing and hence of the jaw 16; and hence when the handle is forced downwardly again the toe of the pawl 20 will coact with a tooth to the left of the one with which it coacted before, and the nut will be compressed more and probably suitably broken.

In order to allow the casing to be slid away from the fixed jaw it becomes necessary to elevate both pawls from the rack when the handle is raised. This results by means of the fingers 23a which are fixed to the pawl 22 and which project through an opening 24 of the pawl 20. When the pawl 20 is elevated by the handle the fingers 23a strike the edge 25 of the pawl 20 and the fingers are thus elevated with the pawl 20 elevating the toe 23 away from the rack, so that the casing 12 may be shoved backwards as far as may be desired.

It is to be understood, however, that various details herein set forth are merely illustrative of my invention, and modifications therein may be made by those familiar with the art without departing from the spirit of my invention as disclosed by the following claim.

I claim as my invention:

A nut cracker comprising a support, a jaw fixed adjacent one end of the support, a second jaw slidably mounted on the support, a handle pivoted with reference to the second jaw, a rack fixed with reference to the support and paralleled therewith, a first pawl pivoted with reference to the handle and adapted to coact with the rack when the handle is lowered, the pawl having an opening therethrough, means for moving the pawl from coaction with the rack when the handle is raised, a second pawl pivoted with reference to the handle and coacting with the rack when the handle is lowered, a finger fixed to the second pawl and projecting through the opening and adjacent the edge of the opening, whereby when the first pawl is raised the finger will strike the said edge and will be elevated thus elevating the second pawl away from the rack.

GRACE M. KRAG.